US008620232B2

(12) United States Patent
Helsloot (10) Patent No.: US 8,620,232 B2
(45) Date of Patent: Dec. 31, 2013

(54) POST FILTER FOR SPECTRAL DOMAIN ECHO CANCELLERS TO HANDLE NON-LINEAR ECHO COMPONENTS

(71) Applicant: Dialog Demiconductor B.V., 's-Hertogenbosch (NL)

(72) Inventor: Michiel Andre Helsloot, 's-Hertogenbosch (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 13/653,957

(22) Filed: Oct. 17, 2012

(65) Prior Publication Data

US 2013/0217349 A1    Aug. 22, 2013

(30) Foreign Application Priority Data

Feb. 22, 2012  (EP) .................................... 12156590

(51) Int. Cl.
    *H04B 1/04*  (2006.01)
(52) U.S. Cl.
    USPC ............. 455/114.2; 455/114.1; 455/114.3; 455/127.2; 455/202; 379/406.04; 379/406.05
(58) Field of Classification Search
    USPC ........... 455/114.2, 114.1, 114.3, 127.2, 202; 379/406.04, 406.05
    See application file for complete search history.

(56) References Cited

U.S. PATENT DOCUMENTS 5,680,450 A * 10/1997 Dent et al. .............. 379/406.08
6,658,107 B1 * 12/2003 Sorqvist et al. ......... 379/406.05
6,904,146 B2 * 6/2005 Domer et al. ........... 379/406.01
7,046,794 B2 * 5/2006 Piket et al. .............. 379/406.04
2004/0018860 A1  1/2004 Hoshuyama
2009/0214048 A1  8/2009 Stokes, III et al.

FOREIGN PATENT DOCUMENTS

EP   1 601 171       11/2005
WO   WO 03/010950   2/2003

OTHER PUBLICATIONS

European Search Report—12156590.7-2414, Mail date—Jul. 13, 2012, Dialog Semiconductor B.V.

* cited by examiner

*Primary Examiner* — Sanh Phu
(74) *Attorney, Agent, or Firm* — Saile Ackerman LLC; Stephen B. Ackerman (57) ABSTRACT

The present document discloses a method and system for improving echo cancellation in the presence of non-linear distortions. A circuit attenuates a transmit signal in one or more spectral bands based on a receive signal. The distorted echo comprised within the transmit signal results from distortions incurred by the receive signal when being rendered by an electronic device. The circuit compares energy values of the receive signal in multiple spectral bands with multiple corresponding spectral band dependent distortion thresholds and determines that for a first spectral band from multiple spectral bands. A first energy value from multiple energy values exceeding a first distortion threshold from multiple distortion thresholds attenuates the transmit signal in one or more spectral bands at higher frequencies than the first spectral band with corresponding spectral band dependent attenuation factors.

47 Claims, 8 Drawing Sheets

POST FILTER FOR SPECTRAL DOMAIN ECHO CANCELLERS TO HANDLE NON-LINEAR ECHO COMPONENTS

TECHNICAL FIELD

The present document relates to echo cancellation. In particular, the present document relates to a method and system for improving the performance of echo cancellation in the presence of non-linear distortions.

BACKGROUND

Time domain, e.g. Least Mean Square (LMS) and spectral domain echo cancellers typically have a reduced echo cancelling performance if there are distortions in the (acoustic) echo path. Such distortions may be due to resonances and distortions caused by the speaker cabinet of an electronic device (e.g. a mobile telephone, a smartphone, or a cordless phone) operated in a hands free mode. In typical hands free applications, the speaker of the electronic device is the dominant non-linear component in the acoustic echo path, but the cabinet of the electronic device usually contributes to additional non-linearities with various kinds of acoustic and mechanical resonances.

In order to compensate for the loss of (full duplex) echo attenuation (due to the non-linear distortions comprised within the echo path), electronic devices usually incorporate a certain level of half duplex attenuation (e.g. by using a spectral domain or time domain echo suppressor/switch). Such half duplex attenuation typically applies a single attenuation factor that attenuates the entire effective audio spectrum of the upstream audio signal (i.e. the audio signal which is transmitted from the electronic device towards a communication network).

The half duplex attenuation leads to a reduced duplexity of the telephone conversation and consequently to a reduced perceptual performance of the hands free application. The present document describes methods and systems which address the above mentioned limitation of echo cancellers in the presence of non-linear distortions, thereby improving the perceptual performance (notably the perceived duplexity) of hands free applications.

SUMMARY OF THE DISCLOSURE

A principal object of the present disclosure is to achieve a method and system for improving the performance of echo cancellation in the presence of non-linear distortions of mobile electronic communication devices.

A further object of the disclosure is to improve the perceptual performance of hands-free applications of mobile electronic communication devices.

A further object of the disclosure is to achieve a perceived duplexity of hands-free applications of mobile electronic communication devices.

In accordance with the objects of this disclosure an attenuation circuit configured to attenuate a transmit signal in one or more spectral bands based on a receive signal; wherein the transmit signal comprises an echo of the receive signal, wherein the echo comprised within the transmit signal comprises distortions incurred by the receive signal when being rendered by an electronic device having rendering characteristics, has been achieved. The circuit disclosed is configured to compare a plurality of energy values of the receive signal in a plurality of spectral bands with a corresponding plurality of spectral band dependent distortion thresholds, to determine that for a first spectral band from the plurality of spectral bands a first energy value from the plurality of energy values exceeds a corresponding first distortion threshold from the plurality of distortion thresholds, and to attenuate the transmit signal in one or more spectral bands from the plurality of spectral bands at frequencies higher than the first spectral band with corresponding one or more spectral band dependent attenuation factors, wherein the one or more spectral band dependent attenuation factors are based on the rendering characteristics of the electronic device.

In accordance with the objects of this disclosure a method for attenuating a transmit signal in one or more spectral bands based on a receive signal, wherein the transmit signal comprises an echo of the receive signal, wherein the echo comprised within the transmit signal comprises distortions incurred by the receive signal when being rendered by an electronic communication device having rendering characteristics has been achieved. The method disclosed comprises: providing a mobile electronic communication device having a transceiver and a microphone, wherein a transmit signal is to be attenuated in one or more spectral bands, comparing a plurality of energy values of a receive signal in a plurality of spectral bands with a corresponding plurality of spectral band dependent distortion thresholds, determining that for a first spectral band from the plurality of spectral bands, a first energy value from the plurality of energy values exceeds a corresponding first distortion threshold from the plurality of distortion thresholds, and attenuating the transmit signal in one or more spectral bands from the plurality of spectral bands at frequencies higher than the first spectral band with corresponding one or more spectral band dependent attenuation factors, wherein the one or more spectral band dependent attenuation factors are based on the rendering characteristics of the electronic communication device.

In accordance with the objects of this disclosure a circuit for measuring total harmonic distortion characteristic of a transducer of an electronic mobile communication device has been achieved. The circuit disclosed comprises: a receive signal path firstly comprising: an automatic gain controller, a volume controller at the output of the automatic gain controller, and a first equalization filter at the output of the volume controller. Furthermore the receive path comprises a transducer at the output of equalization filter, means for generating a sweep of sinusoids at different frequencies providing input to the volume controller, and an external microphone recording an acoustic signal emitted by the speaker, which is excited by the sinusoids at a particular frequency f, wherein the emitted acoustic signal may comprise signal power at higher harmonic frequencies of the particular frequency f and wherein a signal power at higher harmonic frequencies is due to non-linear distortions of the signal at the fundamental frequency f.

In accordance with the objects of this disclosure an echo suppression circuit for an electronic device has been achieved. The circuit disclosed comprises firstly: a speaker and a microphone, wherein a receive signal is rendered by the speaker and a captured signal is captured by the microphone, wherein the captured signal comprises an echo of the receive signal, wherein the echo comprises a primary echo component in a first spectral band and one or more distortion echo components in one or more spectral bands at frequencies higher than the first spectral band, wherein the echo suppression circuit comprising: an echo cancelling circuit configured to estimate the primary echo component from the receive signal and to remove the estimated primary echo component from the captured signal, thereby yielding a transmit signal, and a frequency dependent post filter configured to attenuate the transmit signal in the one or more spectral bands; wherein the transmit signal comprises an echo of the receive signal; wherein the echo comprised within the transmit signal comprises distortions incurred by the receive signal when being rendered by an electronic device having rendering characteristics. The post filter is configured to compare a plurality of energy values of the receive signal in a plurality of spectral bands with a corresponding plurality of spectral band dependent distortion thresholds, to determine that for a first spectral band from the plurality of spectral bands, a first energy value from the plurality of energy values exceeds a corresponding first distortion threshold from the plurality of distortion thresholds, and to attenuate the transmit signal in one or more spectral bands from the plurality of spectral bands at frequencies higher than the first spectral band with corresponding one or more spectral band dependent attenuation factors; wherein the one or more spectral band dependent attenuation factors are based on the rendering characteristics of the electronic device.

According to an aspect, an attenuation circuit configured to attenuate a transmit signal in two or more spectral bands based on a receive signal is described. The attenuation circuit may be integrated into an electronic device (e.g. a mobile telephone, a smartphone or a cordless phone) having a transceiver (e.g. a speaker) for rendering a so called receive signal (received from a communication network), and having a microphone for capturing an audio signal which is to be transmitted as the transmit signal to the communication network. In cases where the electronic device is operated in a hands free mode, the transmit signal comprises a distorted version of the receive signal. This distorted version of the receive signal comprised within the transmit signal typically results from an echo of the rendered receive signal captured by the microphone of the electronic device. As such, it may be stated that the transmit signal comprises a distorted echo of the receive signal.

The rendered receive signal (and by consequence the echo comprised within the transmit signal) comprises distortions which are incurred by the receive signal when being rendered by the electronic device having rendering characteristics. In other words, the electronic device typically introduces distortions into the receive signal when rendering the receive signal. These distortions are typically non-linear, meaning that these distortions typically introduce additional frequency components to the receive signal. As such, the non-linear distortions of the receive signal in a first spectral band may lead to signal energy of the distorted receive signal in spectral bands other than the first spectral band. Typically, the distortions are dependent on the rendering characteristics of the electronic device. The rendering characteristics (and in particular the type of distortions incurred by the receive signal when being rendered by the electronic device) may be due to acoustic and/or mechanical resonances generated by the speaker of the electronic device when rendering the receive signal. The rendering characteristics are typically frequency dependent.

The rendering characteristics of the electronic device may be described by a transfer function which converts the receive signal into the acoustic signal emitted by the transceiver of the electronic device. By way of example, the rendering characteristics of the electronic device may be described by one or more of: a frequency dependent total harmonic distortion (THD) of the electronic device or an echo canceller performance of an echo canceller comprised within the electronic device. Furthermore, the rendering characteristics may be dependent on at least one or more of: a battery level of a battery comprised within the electronic device, a volume setting of a volume controller associated with the electronic device, aging of the transceiver (speaker), the ambient temperature, a degree of humidity.

It should be noted that the rendering characteristics of the electronic device may be time-dependent, i.e. the rendering characteristics may change over time. This may be due to a (slow) aging process or to more rapidly changing environmental conditions. By way of example, the rendering characteristics of the electronic device may be different, when the device lies on the table than when the device is held in a hand. Hence, it may be beneficial to periodically determine the rendering characteristics (with a pre-determined frequency). By way of example, the echo canceller performance of the echo canceller of the device may be determined periodically at the pre-determined frequency.

The attenuation circuit is configured to compare a plurality of energy values of the receive signal in a plurality of spectral bands with a corresponding plurality of spectral band dependent distortion thresholds. For this purpose, the receive signal may be transformed into the frequency domain, wherein the frequency domain may be split up into a plurality of spectral bands (e.g. n=1, . . . , N spectral bands, with N being an integer, with N being greater than 1, 2, 3, 4, 5, 10, 20, 30, 40, 50). The tradeoff between time resolution vs. frequency resolution of the time-frequency transform (e.g. a DCT, a FFT, STFT, etc.) may be tuned to the particular electronic device. Typical values are N=12 for received signals at a sampling frequency of 8 kHz, and N=15 for received signals at a sampling frequency of 16 kHz. The plurality of spectral bands may have critical band spacing, i.e. the width of the different spectral bands within the plurality of spectral bands may be adapted to perception characteristics of the human ear. Such critical band spacing may have an exponential increase of the width of the spectral bands along the frequency axis. Alternatively, uniform band spacing may be used.

For each of the plurality of spectral bands, a corresponding energy value $E(n)$ may be determined for the receive signal within the spectral band n. The energy values $E(n)$ may be determined for a particular frame (comprising a pre-determined number of samples) of the receive signal. Furthermore, the energy values $E(n)$ may be determined as moving averages over a pre-determined time interval of the receive signal. In addition, for each of the plurality of spectral bands, a corresponding spectral band dependent distortion threshold $T(n)$, n=1, . . . , N, may have been determined for the electronic device. Typically, the distortion thresholds $T(n)$ may be determined offline based on the rendering characteristics of the electronic device. Alternatively or in addition, the distortion threshold $T(n)$ may be determined in real-time based on the rendering characteristics. As indicated above, the rendering characteristics may change over time and may be determined by the device in a periodic manner. By consequence, the distortion threshold $T(n)$ may be time-dependent and may take into account current rendering characteristics of the device (e.g. measured via the echo canceller performance).

The distortion threshold $T(n)$ of spectral band n may indicate the tendency of the electronic device to creating distortions in neighboring spectral bands n+x and/or n−x (x=1, 2, 3, 4 etc.), subject to the rendering of a receive signal having spectral components in the distorting spectral band n. A low distortion threshold $T(n)$ indicates a high tendency to creating distortions and vice versa. As such, in an embodiment the distortion threshold $T(n)$ is inversely proportional to the total harmonic distortion (THD) value of the electronic device in the spectral band n.

The attenuation circuit is further configured to determine that for a first spectral band from the plurality of spectral bands, a first energy value from the plurality of energy values exceeds a corresponding first distortion threshold from the plurality of distortion thresholds. In other words, the attenuation circuit is configured to determine the presence of a distorting spectral component within the first spectral band of the receive signal by determining that E(m)>T(m) in the spectral band m (referred to as the first spectral band).

In addition, the attenuation circuit is configured to attenuate the transmit signal in one or more (or two or more) spectral bands from the plurality of spectral bands at frequencies higher than the first spectral band with corresponding one or more (or two or more) spectral band dependent attenuation factors A(n). In other words, the attenuation circuit may be configured to attenuate the transmit signal in one or more (or two or more) spectral bands from the plurality of spectral bands other than the first spectral band. The one or more (or two or more) spectral band dependent attenuation factors A(n) may be dependent on the first spectral band. Furthermore, the one or more (or two or more) spectral band dependent attenuation factors are typically different from each other. As such, the one or more (or two or more) spectral band dependent attenuation factors A(n) may be a function of the spectral band n which is being attenuated. Furthermore, the one or more (or two or more) spectral band dependent attenuation factors A(n) may be based on the rendering characteristics of the electronic device.

Usually, the attenuation circuit is configured to apply a plurality of spectral band dependent attenuation factors A(n), n=1, ..., N, to the corresponding plurality of spectral bands n=1, ..., N of the transmit signal. This plurality of attenuation factors A(n) may comprise one or more attenuation components $A_i(n)$, i=1, ..., K, with K being a positive integer, e.g. K greater 0, 1, 2, 3. In an embodiment, the overall attenuation factor A(n) of spectral band n is determined as the sum of the one or more attenuation components $A_i(n)$.

A first attenuation component $A_1(n)$ may be dependent on the first spectral band. More specifically, the number of attenuation components K may correspond to the number of distorting spectral bands m (for which E(m)>T(m)) determined by the attenuation circuit. Each of the K attenuation components $A_i(n)$, i=1, ..., K, may be dependent on a corresponding one of the K distorting spectral bands.

The first attenuation component $A_1(n)$ of the one or more (two or more) spectral band dependent attenuation factors may approximate a spectral shape of the rendering characteristics of the electronic device, when the electronic device is rendering a spectral component in the first spectral band of the receive signal. In other words, each of the K attenuation components $A_i(n)$, i=1, ..., K, may approximate the spectral shape of distortions caused by the electronic device when rendering a receive signal comprising a spectral component (only) in the corresponding one of the distorting spectral bands.

The first attenuation component $A_1(n)$ may decrease with increasing spectral distance from the first spectral band. In other words, an attenuation component $A_i(n)$ may decrease with increasing spectral distance from its corresponding distorting spectral band. The curve of the attenuation component $A_i(n)$ may be adapted to the curve of the power of the distortion components generated by the spectral component of the receive signal within the distorting spectral band. As shown in the present document, the power of the distortion components typically decreases in an exponential manner with the spectral distance from the distorting spectral band. Consequently, an attenuation component $A_i(n)$ of a corresponding distorting spectral band may decrease according to an exponential function having a nominal attenuation and decay constant. The nominal attenuation and the decay constant may be determined based on the rendering characteristics of the electronic device (e.g. the THD of the electronic device).

As indicated above, the curve of the attenuation component $A_i(n)$ may be adapted to the curve of the power of the distortion components generated by the spectral component of the receive signal within the distorting spectral band. Approximation curves other than an exponential function may be used. By way of example, the attenuation component $A_i(n)$ may be approximated to the curve of the power of the distortion components using a polynomial of a pre-determined order. Other approximation methods and curves are also possible. This may be appropriate for cases where the odd and the even higher order harmonics of the distorting spectral component have a different spectral decay.

The attenuation circuit described in the present document is typically operated in conjunction with an echo canceller. Such an echo canceller is usually configured to cancel an undistorted echo of the receive signal within the signal captured by the internal microphone of the electronic device (the so called captured signal). As such, it may be assumed that the echo canceller is configured to remove the echo comprised within a distorting spectral band. By way of example, in case the first spectral band has been determined to be a distorting spectral band, the echo canceller is typically configured to remove an echo from the first spectral band. As such, the attenuation component $A_1(n)$ for the first spectral band may be set to one, as the undesirable echo component has already been removed by a preceding echo canceller. More generally, the attenuation components $A_i(n)$ may be set to one (meaning "no attenuation") for the corresponding distorting spectral bands.

As indicated above, the overall attenuation factors A(n) which are applied by the attenuation circuit may comprise a plurality of attenuation components $A_i(n)$. In particular, the attenuation circuit may be configured to determine that for a second spectral band from the plurality of spectral bands, a second energy value from the plurality of energy values exceeds a corresponding second distortion threshold from the plurality of distortion thresholds. In such cases, the one or more (or two or more) spectral band dependent attenuation factors A(n) may comprise a second attenuation component $A_2(n)$ dependent on the second spectral band. In a similar manner to the first attenuation component $A_1(n)$, the second attenuation component $A_2(n)$ may decrease with increasing spectral distance from the second spectral band. The one or more (or two or more) spectral band dependent attenuation factors A(n) may then be based on a combination of the first and the second attenuation components, e.g. $A_1(n)+A_2(n)$.

As a result of intermodulation products, a distorting spectral band typically also generates distortion components at frequencies which are lower than the frequencies of the distorting spectral band. In order to be able to attenuate such intermodulation products, the attenuation circuit may be configured to attenuate the transmit signal in one or more spectral bands from the plurality of spectral bands at lower frequencies than the first spectral band with corresponding one or more lower spectral band dependent attenuation factors. The lower spectral band dependent attenuation factors may be determined in an analogous manner to the attenuation factors A(n) which are applied to the higher frequencies. In particular, the one or more lower spectral band dependent attenuation factors may be based on the rendering characteristics of the electronic device.

In a similar manner to the one or more (or two or more) spectral band dependent attenuation factors, the one or more lower spectral band dependent attenuation factors may comprise a first attenuation component dependent on the first spectral band. More generally, the lower attenuation factors may comprise one or more attenuation components $A_i(n)$ which are dependent the on corresponding K distorting spectral bands. The first attenuation component of the one or more lower spectral band dependent attenuation factors may be symmetrical to the first attenuation component of the one or more (or two or more) spectral band dependent attenuation factors with regards to the first spectral band. More generally, it may be stated that the one or more attenuation components $A_i(n)$ of the attenuation factors $A(n)$, $n=1, \ldots, N$, applied by the attenuation circuit may be symmetrical with regards to their corresponding distorting spectral band.

According to another aspect, a method for attenuating a transmit signal in one or more (or two or more) spectral bands based on a receive signal is described. The transmit signal comprises a distorted echo of the receive signal. The distorted echo comprised within the transmit signal results from distortions incurred by the receive signal when being rendered by an electronic device having rendering characteristics. The method comprises comparing a plurality of energy values of the receive signal in a plurality of spectral bands with a corresponding plurality of spectral band dependent distortion thresholds. Furthermore, the method comprises determining that for a first spectral band from the plurality of spectral bands, a first energy value from the plurality of energy values exceeds a corresponding first distortion threshold from the plurality of distortion thresholds. In addition, the method comprises attenuating the transmit signal in one or more (or two or more) spectral bands from the plurality of spectral bands at frequencies higher than the first spectral band with corresponding one or more (or two or more) spectral band dependent attenuation factors, wherein the one or more (or two or more) spectral band dependent attenuation factors are based on the rendering characteristics of the electronic device.

The method may further comprise estimating an echo in the first spectral band from the receive signal and receiving a captured signal. The captured signal comprises the distorted echo of the receive signal. The method may further comprise removing the estimated echo in the first spectral band from the captured signal, thereby yielding the transmit signal.

According to a further aspect, an echo suppression circuit for an electronic device comprising a speaker and a microphone is described. A receive signal is rendered by the speaker and a captured signal is captured by the microphone. The captured signal comprises a distorted echo of the receive signal. This distorted echo comprises at least one primary echo component in a first spectral band and one or more (or two or more) distortion echo components in one or more (or two or more) spectral bands at frequencies higher (and possibly lower) than the first spectral band. The one or more (or two or more) distortion echo components in the one or more (or two or more) spectral bands are typically due to a signal component of the receive signal in the first spectral band.

The echo suppression circuit comprises an echo cancelling circuit configured to estimate the primary echo component from the receive signal and to remove the estimated primary echo component from the captured signal, thereby yielding a transmit signal (wherein the transmit signal typically comprises higher order distorted echo components). Furthermore, the echo suppression circuit comprises an attenuation circuit according to any of the aspects outlined in the present document. This attenuation circuit is configured to attenuate the transmit signal in the one or more (or two or more) spectral bands at higher (and possibly lower) frequencies than the first spectral band.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein

FIG. 1b shows example resonance cavities within the electronic device of FIG. 1a;

DETAILED DESCRIPTION

Figure 1A:
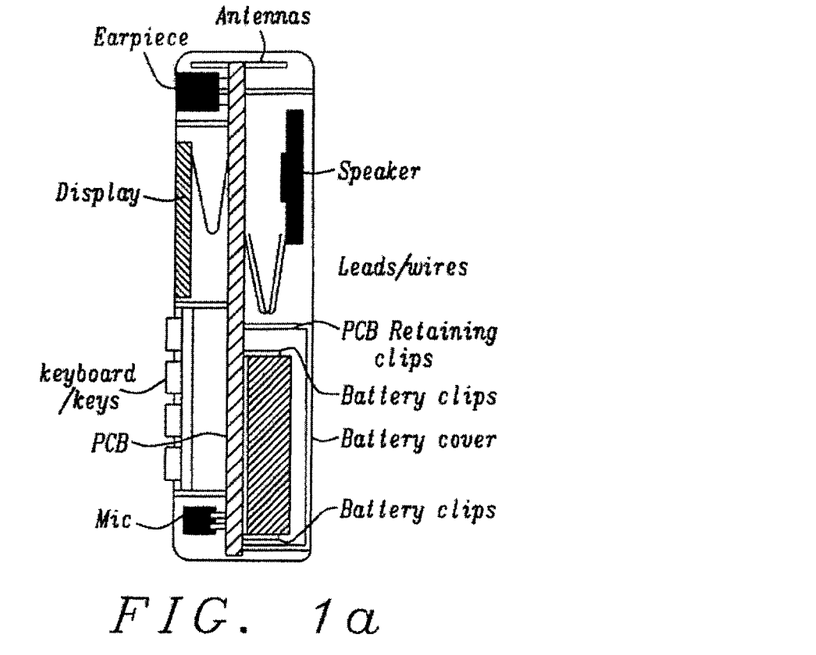
FIG. 1a illustrates an example electronic device.
Figure 1B:
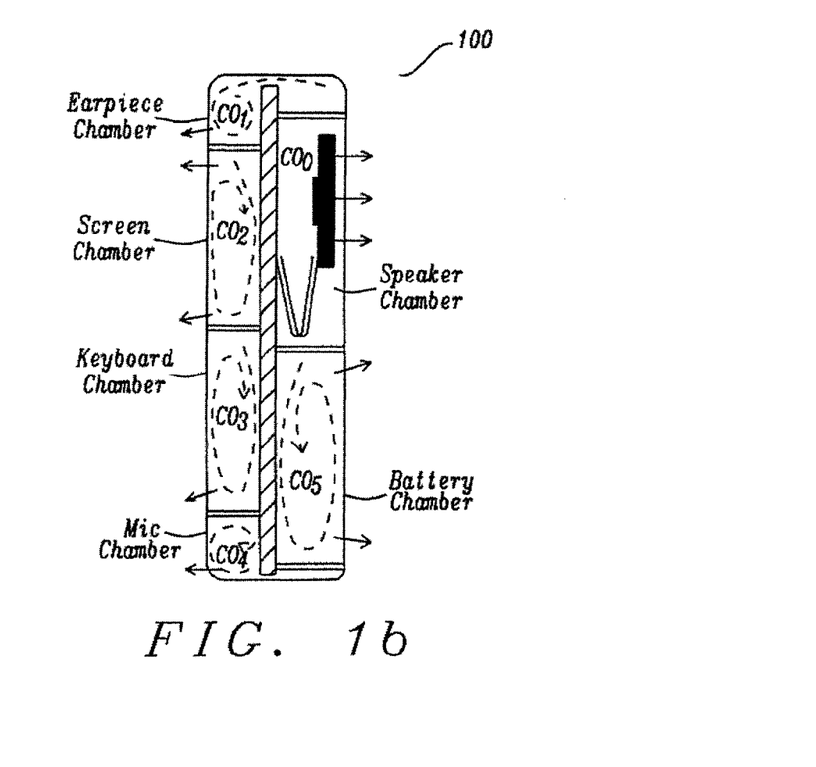

FIGS. 1a and b illustrate an example device 100 with which (and in particular within which) the systems and methods described in the present document may be used. The example device 100 comprises a transducer (in the present example a speaker) which is surrounded by a cabinet (also referred to as an enclosure, casing or housing). The example electronic device 100 may be a cordless handset or a wireless telephone. The device 100 may be subject to various mechanical resonances caused by the different components of the device, such as the keyboard and keys, the display, the printed circuit board (PCB), the wires and the leaded components, the mounted antennas, the battery clips & cover, and the telephone receiver. Furthermore, the device 100 may be subject to various acoustic resonances in the various chambers within the device 100 (see FIG. 1b). The combination of mechanical and acoustic resonances leads to a complex total harmonic distortion characteristic of the device 100, as illustrated e.g. by the diagram 206 in FIGS. 2a and 2b. This complex total harmonic distortion characteristic impacts the echo cancellation performance of an echo canceller comprised within the electronic device 100 as will be outlined in the following.

Figure 2A:
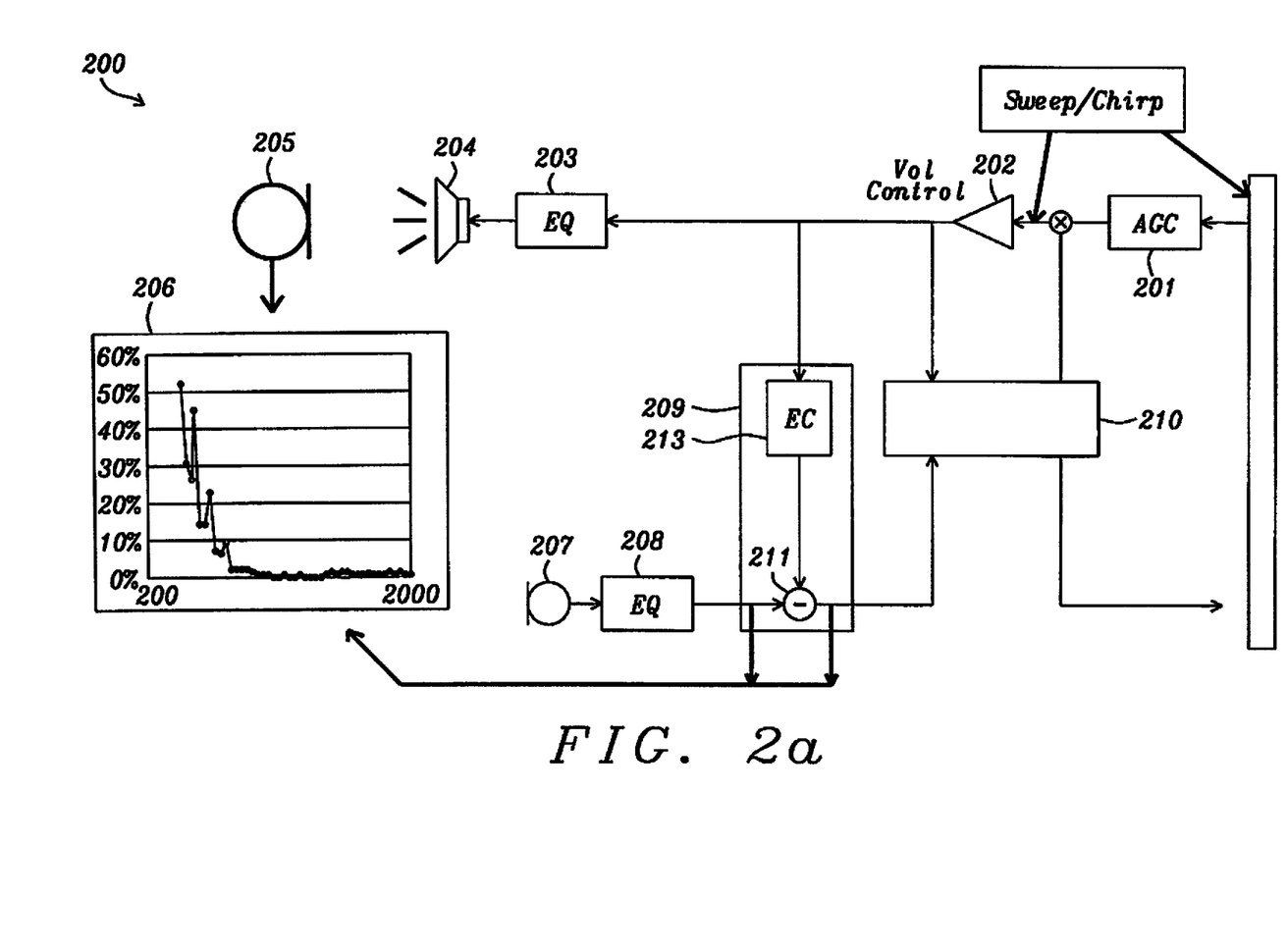
FIG. 2a illustrates an example echo path of an electronic device in hands free mode.

In FIG. 2a, an example setup 200 for measuring the total harmonic distortion (THD) characteristic of an example transducer 204 (a speaker) and/or for measuring the performance of an example echo canceller 209 of an electronic device 100 is illustrated. The setup 200 comprises the components of the electronic device 100, i.e. notably an automatic gain controller (AGC) 201, a volume controller 202, an equalization filter 203 and the speaker 204 on the downstream or receive signal path of the electronic device 100. Furthermore, the setup 200 comprises means for generating a sweep of sinusoids at different frequencies (and/or possibly white noise) at the input to the downstream signal path. The emitted sweep of sinusoids (or the white noise) may be recorded using an external microphone 205. The external microphone 205 records the acoustic signal emitted by the speaker 204 which is excited by a sinusoid at a particular frequency f (or by the white noise). The emitted acoustic signal comprises signal power at the particular frequency f. Furthermore, the emitted acoustic signal may comprise signal power at higher harmonic frequencies of the particular frequency f (i.e. at higher harmonic frequencies of the fundamental frequency f). As already indicated above, such signal power at higher harmonic frequencies may be due to non-linear distortions (e.g. resulting from acoustic or mechanical resonances) of the signal at the fundamental frequency f.

Figure 2B:
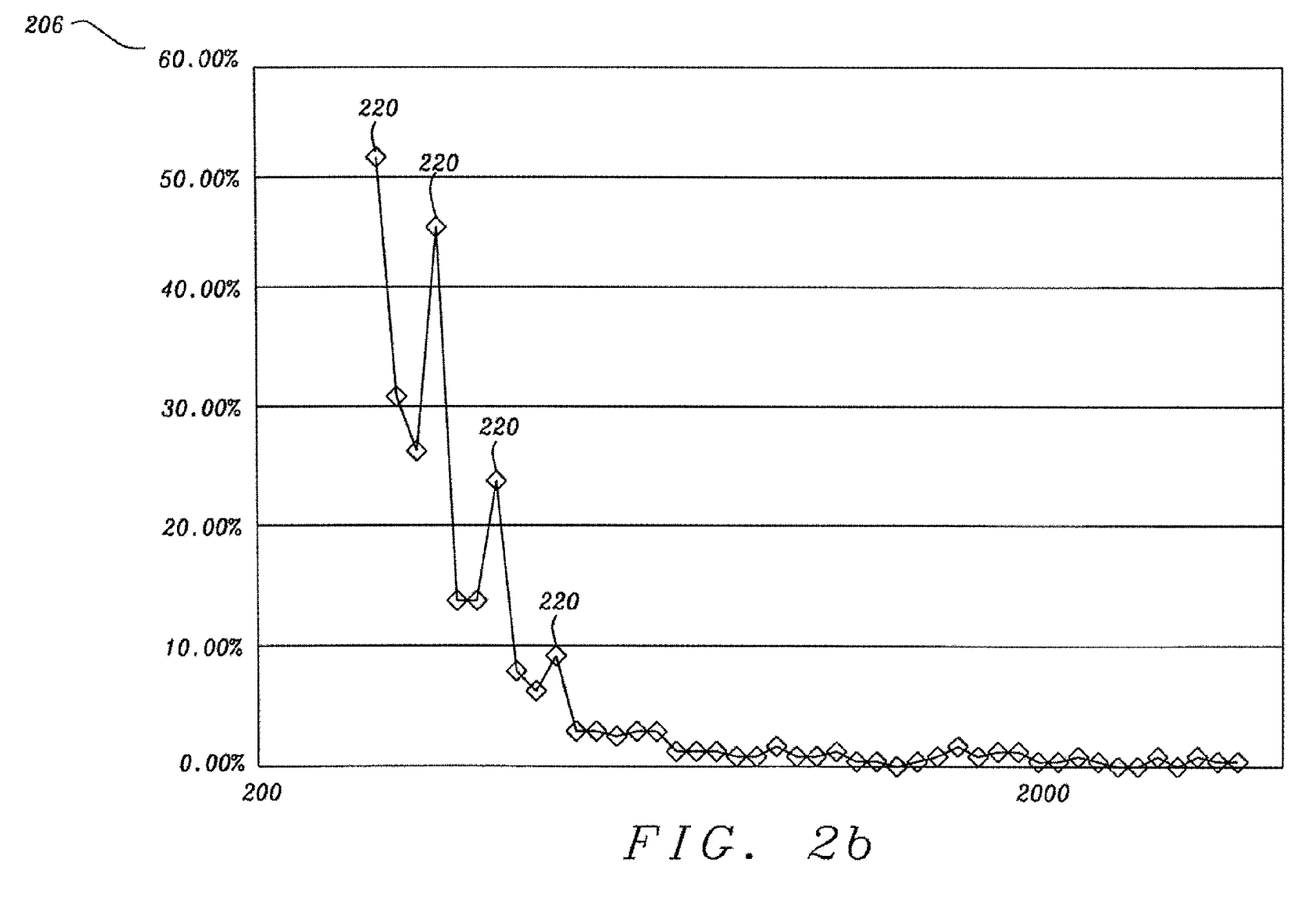
FIG. 2b shows an example Total harmonic Distortion curve.

The THD for the particular frequency f, i.e. THD(f), may be determined from the energy or power of the emitted audio signal at the particular frequency f, and from the energy or power of the emitted audio signal at the higher harmonic frequencies. By way of example, the THD for the particular frequency f may be determined as the ratio of the sum of all powers of the higher harmonic frequencies to the power of the particular frequency f. An example THD characteristic 206 is illustrated in FIGS. 2a and 2b. It can be seen that the THD(f) curve 206 comprises a plurality of local maxima 220 for particular frequencies f for which a relatively high amount of distortion power at different frequencies is generated.

Alternatively or in addition, the setup 200 may be used to determine the echo canceller performance vs. frequency. For this purpose, the emitted sweep of sinusoids is recorded using the internal microphone 207 of the electronic device 100. The recorded (or captured) audio signal may be processed by an equalization filter 208 within the upstream or transmit signal path of the electronic device 100. Subsequently, the recorded audio signal is corrected by a predicted audio signal at the output of the echo cancellation filter 209 using the echo cancellation adder, thereby yielding an echo cancelled signal. The predicted audio signal is determined from the audio signal on the receive signal path using the echo cancellation filter 209. For this purpose, the echo cancellation filter 209 may make use of a linear prediction filter, which is part of the echo cancelling unit 209, determining the predicted audio signal as a weighted linear combination of one or more delayed versions of the audio signal on the receive signal path. As such, the predicted audio signal typically only comprises (weighted) spectral components already comprised within the audio signal on the receive signal path.

As outlined above, the audio signal rendered by the speaker 204 may comprise harmonic (non-linear) distortions of the audio signal on the receive signal path (e.g. caused by acoustic and/or mechanical resonances of the electronic device 100). As such, also the echo cancelled signal may comprise harmonic distortions which are due to the distortions caused by the speaker 204 (and by the entire device 100 comprising the speaker 204). The performance of the echo canceller 209 may be determined as the ratio of the power of the echo cancelled signal and the power of the recorded signal prior to echo cancellation (i.e. prior to the echo cancellation adder). A noise floor estimate may be subtracted from the respective power values before calculating the ratio. If this performance measure is determined for a sweep of frequencies f, a performance vs. frequency diagram 206 is determined. In this case, the vertical axis of diagram 206 would represent the remaining echo energy (which corresponds to the inverse of the echo canceller performance 209). The echo cancellation unit 209 may comprise use of an echo cancellation filter 213 (using e.g. a linear prediction filter) and an echo cancellation adder 211.

Figure 3:
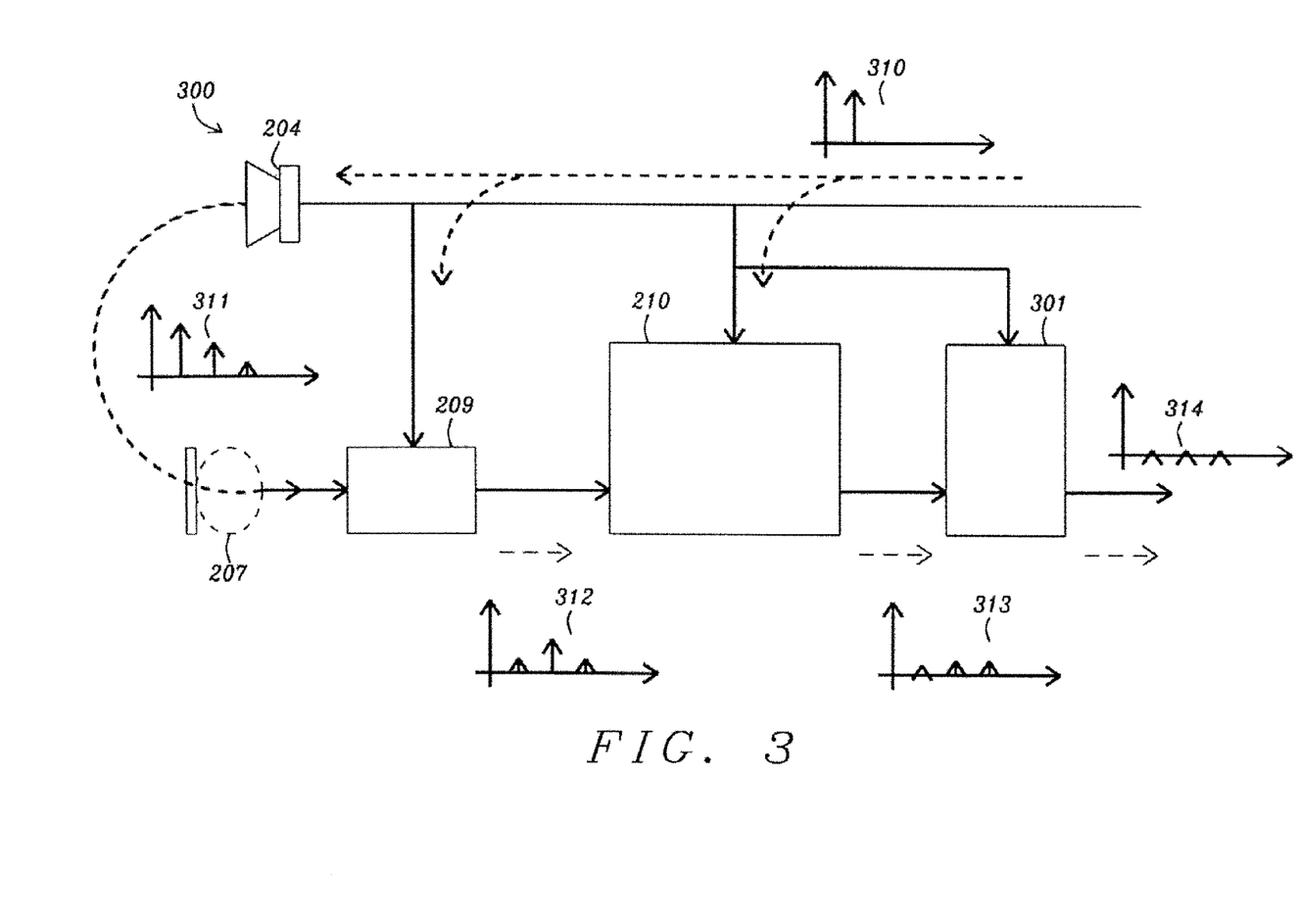
FIG. 3 shows example signal processing for reducing the non-linear distortion components comprised within the echo path of an electronic device in hands free mode.

As such, a typical electronic device 100 which is operated in a hands free mode comprises non-linear distortions within the echo path (i.e. within the signal path of the received audio signal via the speakers 204 and the internal microphone 207) which cannot be reliably removed by the echo cancelling unit 209 within the electronic device 100. Such non-linear distortions within the echo path cause undesirable acoustic effects which may be removed by a so-called echo suppressor 210 (which may also comprise a half-duplex switch configured to attenuate the signal on the receive path and/or the signal on the transmit path with a frequency independent attenuation factor). An echo suppressor 210 typically analyses the audio signal on the receive path and the audio signal on the transmit path. In particular, the echo suppressor 210 may determine the level or power of the audio signals in a plurality of spectral bands. Furthermore, the echo suppressor 210 may determine the ratio of the level or power of the audio signals on the receive path and the transmit path in corresponding spectral bands. If the ratio exceeds a pre-determined threshold, the echo suppressor may switch into a half-duplex attenuation mode, thereby attenuating all spectral bands of the audio signal on the transmit path by a uniform attenuation factor. As a result of such uniform attenuation, the electronic device 100 practically switches into a half-duplex mode, if the echo suppressor 210 determines the presence of a significant amount of echo within one or more spectral bands of the audio signal on the transmit path. This means that the perceived full duplexity of a telephone conversation in hands free mode is reduced. In order to overcome this shortcoming of an echo suppressor 210, the additional or alternative use of a post-filter 301 as illustrated in FIG. 3 is proposed. In other words, the use of a (frequency-domain) post-filter 301 is proposed to extend the echo cancelling performance of a frequency domain echo suppressor 210. An attenuation circuit may correspond to or may comprise the post filter 301.

FIG. 3 illustrates the example device 100 of FIG. 2a comprising an additional post-filter 301 on the transmit path of the device 100. Furthermore, an example spectrum 310 of a received audio signal comprising a single tone (or single sinusoid) is illustrated. The received audio signal is rendered by the speaker 204 of the electronic device 100 which results in a distorted frequency spectrum 311 with one or more higher harmonics of the single tone comprised within the received audio signal. The distorted audio signal is captured by the internal microphone 207 of the electronic device 100 as an echo. The captured echo of the distorted signal spectrum 311 is presented to the echo canceller 209. Example echo cancellers 209 are LMS (Least Mean Square), nLMS (normalized LMS), IPnLMS (Improved Proportionate normalized Least-Mean-Square), APA (Affine Projection Algorithm), RLS (Recursive Least Square), or other.

As indicated above, the echo canceller 209 is typically only able to cancel the fundamental frequency of the distorted echo spectrum 311, since the fundamental frequency was the only frequency present in the 'reference' input (i.e. in the received audio signal) of the echo canceller 209. After cancelling the ground harmonic, the output of the echo canceller 209 typically only comprises the higher distortion components of the echo signal (illustrated by the echo cancelled spectrum 312).

The spectral-domain echo suppressor 210 is typically not able to handle the distorted echo components of the spectrum 312 specifically. Typically, the spectral-domain echo suppressor 210 considers the energy in the 'reference' signal (i.e. the received audio signal) after dividing it into N spectral sub-bands (N being an integer greater than one). For each sub-band the suppressor 210 estimates the echo energy and subtracts the estimated echo energy within the sub-band from the transmit signal (i.e. from the transmit signal subsequent to the echo canceller 209). As outlined above, this is typically achieved by the application of a uniform half duplex attenuation factor, leading to a reduced performance of full duplexity (illustrated by the echo suppressed spectrum 313).

In the present document, the use of a frequency dependent post-filter 301 is proposed (in addition to or alternatively to the use of an echo suppressor 210). The post-filter 301 makes use of a spectral domain representation of the reference signal (i.e. of the received audio signal on the receive path). Furthermore, the post-filter 301 makes use of a predetermined frequency dependent threshold T(f) which is indicative of a frequency dependent degree of distortions caused by the transceiver 204 of the electronic device 100 when rendering the received audio signal. The frequency dependent threshold T(f) may be determined based on the total harmonic distortion (THD) and/or the echo canceller performance curve 206 of the electronic device 100. The post-filter 301 compares the reference signal to the predetermined frequency dependent threshold T(f). If the signal energy is above the predetermined threshold T(f), this may be an indication of the fact that there are non-linear distortions in the echo path. In particular, the post-filter 301 may be configured to determine the signal energy E(n), n=1, ..., N of the reference signal in N spectral bands and compare the signal energy E(n) within the N spectral bands to a corresponding spectral band dependent distortion threshold T(n). The spectral band dependent threshold T(n) may be determined as an average value of the frequency dependent threshold T(f) with the spectral band n. If E(n)>T(n), for at least one of n=1, ..., N, this may indicate the presence of non-linear distortions.

As indicated above, the distortion threshold T(n) may be determined in advance based on the THD and/or the echo canceller performance curve 206 of the electronic device 100. As can be seen from FIGS. 2a and 2b, the THD/echo canceller performance curve 206 indicates the energy of distortions caused by an input signal at a particular frequency f. As such, the curve 206 indicates the frequencies f which triggers a high amount of distortions. Consequently, the distortion threshold T(n) may be inverse proportional to the curve 206, meaning that a high value of curve 206 leads to a low threshold T(n) and vice versa.

The post-filter 301 may make use of critical band spacing, i.e. the spectral bands n=1, ..., N may be selected in accordance to the perception characteristics of the human ear (e.g. a psychoacoustic scale such as a Bark scale or a Mel scale). Such critical band spacing typically makes use of essentially logarithmic frequency spacing. In particular, such psychoacoustic frequency scales may comprise logarithmic frequency spacing for higher frequencies (while comprising linear frequency spacing at lower frequencies). As a result, the higher harmonics of a ground harmonic (also referred to as the fundamental frequency) are typically comprised within different frequency bands than the ground harmonic. In other words, as a result of the critical band spacing (which may be essentially logarithmic), the higher harmonics x*f of a ground harmonic f are usually comprised in the sub-bands n+x, if the ground harmonic f is comprised within the sub-band n (with x being an integer, e.g. x=1, 2, 3, 4, ...).

In case that the post-filter 301 detects the presence of a distorting frequency band n within the reference signal (i.e. in the case that E(n)>T(n)), the post-filter 301 may leave unattenuated the sub-band n comprising the ground harmonic. This is due to the fact that the sub-band n which comprises the ground harmonic f will typically be handled correctly by the echo canceller 209 (and possibly the echo suppressor 210).

On the other hand, the post-filter 301 may apply an additional frequency dependent attenuation in bands on the upper side and/or lower side of the ground harmonic f (i.e. in the bands n+x and/or the bands n−x). The application of an additional frequency dependent attenuation on both sides of the band n, i.e. the attenuation symmetry with respect to band n, may be beneficial in order to capture intermodulation products of the distortions whenever the reference signal is not a pure sine wave. Such intermodulation products may occur when higher order harmonic distortions of reference signals comprising a plurality of frequency components are generated.

The post-filter 301 may determine the frequency dependent attenuation factor in each of the neighbouring bands n+/−x using a smoothing/attack/decay time constant over the frequency range. In other words, the frequency dependent attenuation factor may be described as an exponential function of frequency with a maximum attenuation for the directly adjacent neighbouring bands n+/−1 and with exponentially decreasing attenuation for neighbouring bands which are further away from the distorting band n. The extent of decay of the attenuation factor with frequency may be described by a decay constant of the exponential function. As a result, the post-filter 301 may be configured to attenuate multiple bands n+/−x on each side of the distorting band n, such that distortion components at higher harmonic frequencies will be captured in a similar manner to the distortion component at the second harmonic frequency. In other words, the exponential decay of the attenuation factor mimics the typical exponential decay of power of higher order harmonics, thereby ensuring that the attenuation applied to a spectral band is adapted to the power of the distortion component comprised within the spectral band.

By way of example, the frequency dependent attenuation curve $A(f)$ may be an exponential function which depends on the distorting frequency $f_0$ and on the spectral distance $f-f_0$ from the distorting frequency $f_0$. The attenuation at the first harmonic frequency $f_1$ of the distorting (fundamental) frequency $f_0$ may be set to $A_{max}$ (referred herein as attenuation target). As such, the attenuation curve may be $A(f)=A_{max}*\exp(a*(f_1-f))$ for $f=f_1$, wherein a is the decay time constant. The attenuation curve may be symmetric with regards to the distorting frequency $f_0$. The attenuation factors $A(n)$ for the different spectral bands n may be determined from the attenuation curve $A(f)$. By way of example, the attenuation factor $A(n)$ of a spectral band n may be determined as the (weighted) average of the attenuation curve $A(f)$ for frequencies within the spectral band n or as the maximum value of the attenuation curve $A(f)$ for the frequencies within the spectral band n. The attenuation target $A_{max}$ may be used to limit spectral bands for which the power of the high order harmonics deviates from the typical exponential decay.

It should be noted that the attenuation curve A(f) may be modelled using other functions than an exponential function, in order to approximate the power of the higher order harmonics. Examples are e.g. polynomials of a pre-determined order.

The effect of the post-filter 301 on the spectrum of the transmit signal is illustrated by the spectrum 314 in FIG. 3. It can be seen that by applying a frequency dependent attenuation to the spectral bands in the vicinity of a distorting band n, the higher order harmonics can be suppressed.

Overall, the spectral diagrams 310 to 314 illustrate the effects of the different components of the device 100. A comparison of the spectral diagrams 311 and 310 shows how a receive signal (spectral diagram 310) having a single frequency component at a fundamental frequency is distorted by the speaker 204, thereby yielding a distorted acoustic signal (spectral diagram 311) comprising additional distortion components at harmonic frequencies of the fundamental frequency. This distorted acoustic signal is captured as an echo by the microphone 209 yielding a captured signal comprising the echo. The echo comprises a primary echo component at the fundamental frequency, as well as distortion echo components at the harmonic frequencies. Using an echo cancellation unit 209, the primary echo component can be predicted and (partially) compensated, thereby yielding the echo compensated signal (spectral diagram 312). An optional echo suppressor 210 may be used to attenuate the echo compensated signal, thereby attenuating the spectral components (spectral diagram 313). The post-filter 301 applies a frequency dependent attenuation to the signal, wherein the attenuation depends on the rendering characteristics of the electronic device 100 (e.g. of the speaker 204). Using the frequency dependent attenuation, the distortion echo components can be attenuated in accordance to their power (spectral diagram 314).

As a result of the additional suppression of the neighbouring bands applied by the post-filter 301, the hands-free application is more robust against non-linear distortions in the acoustic echo path. Since the post-filter 301 is configured to capture and attenuate non-linear distortion components, the half-duplex switch and/or the echo suppressor 210 may be made obsolete.

Figure 4:
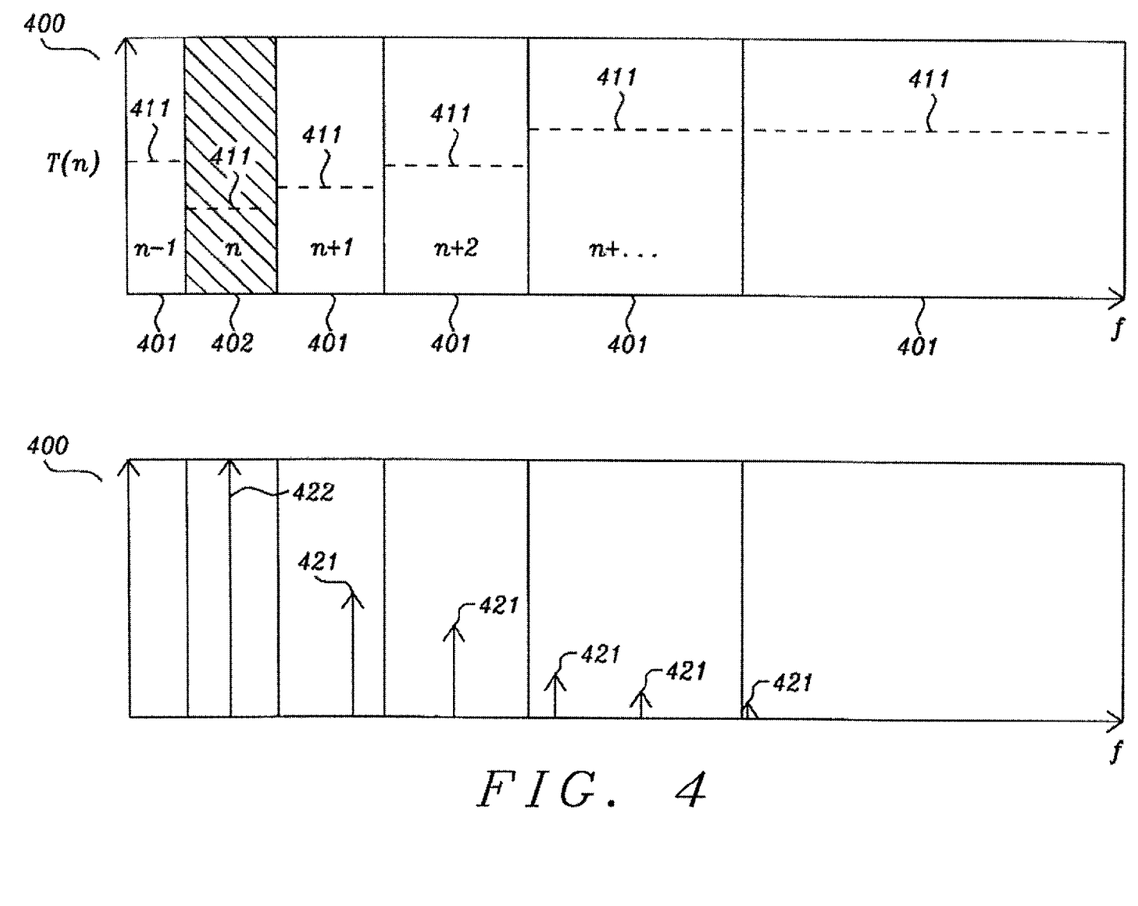
FIG. 4 illustrates example distortion components of the echo path of an electronic device in hands free mode in the spectral domain.

FIG. 4 illustrates a frequency diagram 400 of an example reference signal. In particular, FIG. 4 illustrates the n=1, . . . , N spectral bands 401, 402 of the spectrum of the reference signal. As can be seen, the spectral bands 401, 402 have different spectral width in accordance to the critical band spacing. In particular, it can be seen that the spectral width of the bands n=1, N increases in an essentially logarithmic manner.

Furthermore, FIG. 4 illustrates the frequency dependent distortion thresholds T(n), n=1, . . . , N (reference numerals 411, 412). It can be seen that the distortion thresholds T(n) are different for different spectral bands n. In particular, the distortion thresholds T(n) may be low for spectral bands n within which the electronic device 100 is particularly sensitive to resonances (and vice versa). In the example of FIG. 4, the spectral band 402 has a particularly low distortion threshold 412. If the energy E(n) of the reference signal within the spectral band n 402 exceeds the thresholds T(n) 412, it can be assumed that frequency components of the reference signal within the spectral band n 402 will trigger distortions at higher harmonics. This is illustrated in the frequency diagram 420 of FIG. 4. It can be seen that a frequency component 422 (i.e. the distorting component 422) of the reference signal in spectral band n 402 creates a plurality of distortion components 421 at higher harmonic frequencies within the transmit signal.

Furthermore, it can be seen in the illustrated example that the energy of the distortion components 421 decreases with increasing spectral distance from the ground harmonic of the frequency component 422. This decrease in energy may be referred to as a spectral decay and may be taken into account when designing the attenuation applied by the post-filter 301. In particular, the parameters $A_{max}$ and a of the attenuation curve A(f) may be determined by fitting A(f) to the energy distribution 422, 421 illustrated in the spectral diagram 420. It can also be seen from FIG. 4 that the higher harmonic distortion components 421 mostly lie within different spectral bands 401 of the transmit signal. In particular, it may be observed that each spectral band 411 comprises at least one distortion component 421. As such, the spectral decay of the energy of the distortion components 421 may be applied as a decay factor to the attenuation of the post-filter 301.

Figure 5:
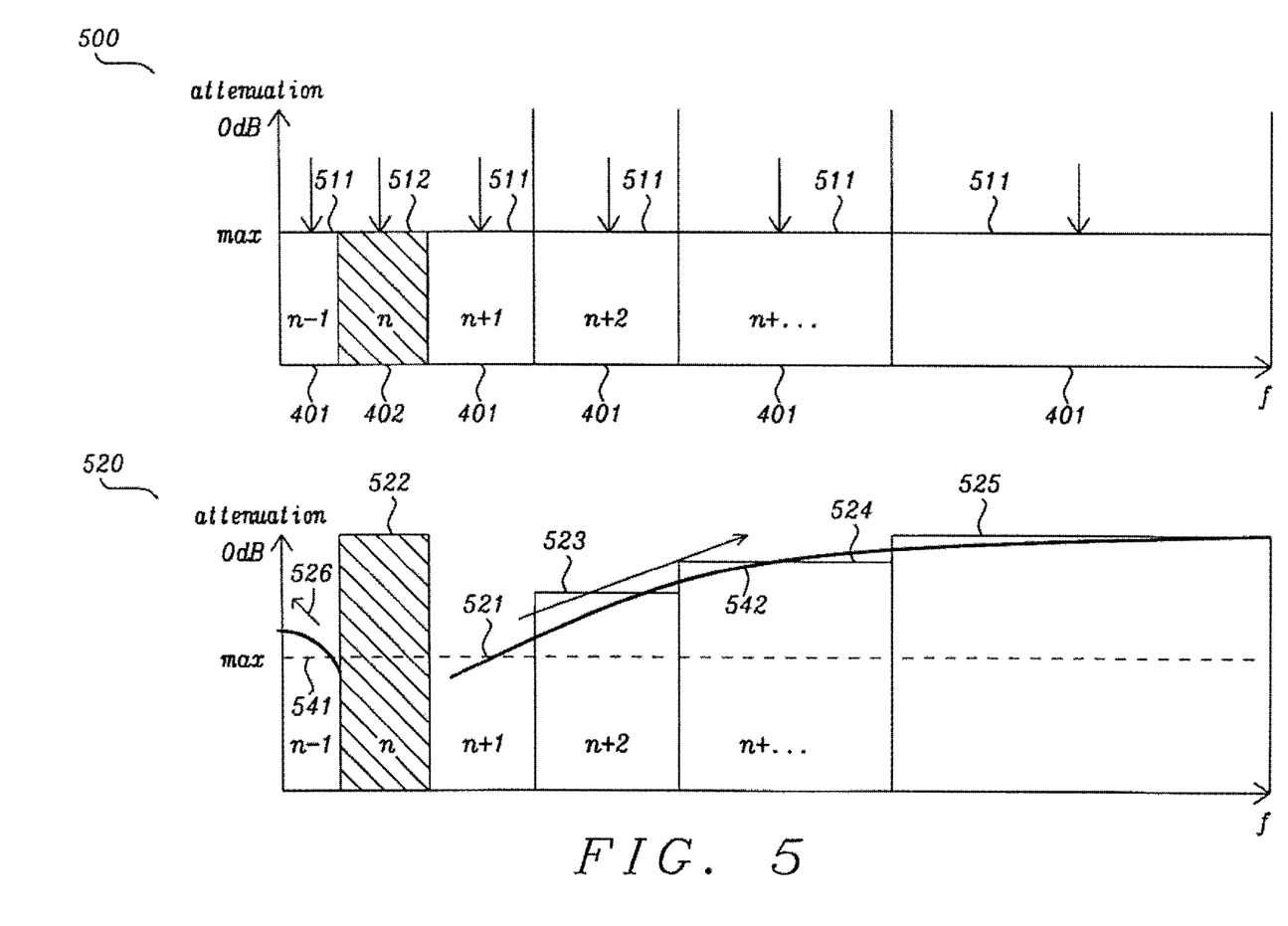
FIG. 5 shows the difference of half duplex attenuation and an example frequency dependent post-filter in the spectral domain.

FIG. 5 illustrates the difference between the function of a half-duplex switch 210 (frequency diagram 500) and the function of the proposed post-filter 301 (frequency diagram 520) in a schematic manner. As outlined above, the half-duplex switch 210 applies a uniform attenuation factor ("max", i.e. reference numerals 511, 512) to all the spectral bands 401, 402 of the transmit signal, if an echo is detected in at least one spectral band 402 of the transmit signal. As a result, the transmit signal is uniformly attenuated by a maximum attenuation factor, even though the energy of the distorted echo is non-uniformly distributed across the different spectral bands 401, 402. This leads to a reduced full duplex performance of the hands-free application of the electronic device 100.

On the other hand, the post-filter 301 applies individual (frequency dependent) attenuation factors to the spectral bands 401 in the neighbourhood of the distorting spectral band 402 which are subject to a spectral decay 541, 542. The spectral decay 541, 542 may be selected in accordance to the spectral decay of the energy of the distortion components 421. Furthermore, it should be noted that the post-filter 301 does not apply any attenuation to the distorting spectral band 402, as it may be assumed that the echo canceller 209 is able to cancel the ground harmonic frequency component 422. Overall, it may be stated that the post-filter 301 is configured to apply a frequency dependent attenuation factor to the transmit signal which is adapted to the power of the echo distortions comprised within the transmit signal. The power of the echo distortions comprised within the transmit signal typically depend on the rendering characteristics of the electronic device 100.

Furthermore, FIG. 5 illustrates the frequency (or spectral band) dependent attenuation factors 521, 522, 523, 524, 525, and 526 which are applied to the different spectral bands 401, 402 of the transmit signal. It can be seen that only the spectral bands 401 (n−1, n+1) in the direct vicinity of the distorting spectral band 402 (n) are submitted to the maximum attenuation 521, 526. The spectral bands 401 (n+2, n+ . . . ) which are at a greater spectral distance from the distorting spectral band 402 (n) are submitted to a reduced attenuation 523, 524, 525. The reduced attenuation 523, 524, 525 follows the spectral decay 541, 542. By way of example, the spectral decay 541, 542 may represent the attenuation curve A(f) and the attenuation factors 521, 523, 524, 525, 526 may be derived from the attenuation curve A(f) (e.g. as average A(f) values within the respective spectral band or as max/min A(f) values within the respective spectral band. In addition, it can be seen that the distorting spectral band 402 (n) is not attenuated (reference numeral 522), because it is assumed that the primary echo component comprised within the distorting spectral band 402 (n) is compensated by the echo compensation unit 209.

In other words, the proposed post-filter 301 does not affect the sub-band (n) 402 that contains the ground harmonic which causes the distortion. Furthermore, the post-filter 301 attenuates the sub-bands (n−1, n+1) on both sides of the sub-band (n) 402 with the ground harmonic the most. In addition, the post-filter 301 attenuates the bands (n−2, n− . . . , n+2, n+ . . . ) further up & down each side of the spectrum, with gradually less attenuation than the first two neighbouring sub-bands.

As a result, the proposed post-filter 301 attenuates the sub-bands 401 which are at a greater spectral distance from the distorting sub-band 402 to a smaller extent. This reduced attenuation is motivated by the fact that the energy of the higher order harmonics decreases with increasing spectral distance from the ground harmonic. The reduced attenuation results in a higher level near-end signal being passed back to the network in a double talk scenario. In other words, the reduced attenuation results in increased full duplex performance of the hands-free application of the electronic device 100.

Figure 6:
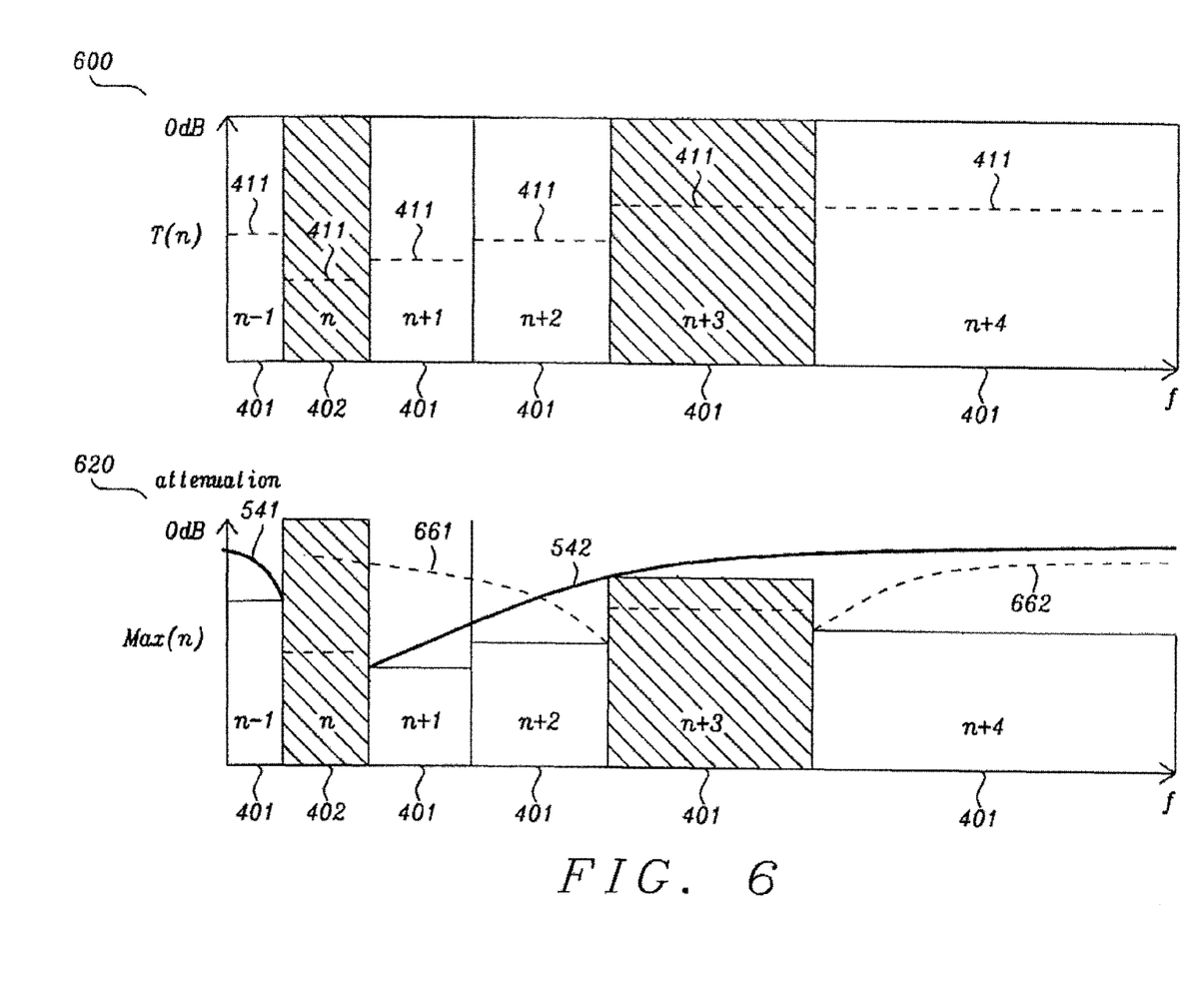
FIG. 6 illustrates an example post-filter for an audio signal comprising multiple distorting frequency bands.

FIG. 6 illustrates example spectral diagrams 600, 620 for a reference signal for which the spectral energy E(n) exceeds the distortion threshold T(n) in a plurality of spectral bands 402, 602. In the illustrated example, a distorting frequency component is detected in the spectral bands (n) and (n+3), i.e. E(n)>T(n) and E(n+3)>T(n+3) for the illustrated reference signal. Each of the distorting frequency components 402, 602 causes distortion (echo) components within the transmit signal, wherein the energy of the distortion components decreases with increasing distance from the distorting component 402, 602. The post-filter 301 determines attenuation factors for each spectral band 401, 402 which are in accordance with the spectral decay 541, 542, 661, 662 of each distorting component 402, 602. The overall attenuation per spectral band 401, 402, 602 may be determined by combining the attenuation factors determined for each distorting component 402, 602. By way of example, the spectral decay functions 541, 542, 661, 662 may be superimposed, thereby yielding a combined decay function from which the attenuation factor per spectral band 401, 402, 602 may be determined.

In general, the overall attenuation curve A(f) may comprise a plurality of attenuation components $A_i(f)$, i=1, . . . , K, for K distorting spectral bands. Each of the attenuation components $A_i(f)$ may be described as an exponential function as outlined in the context of A(f) above. The overall attenuation curve A(f) may be determined e.g. based on the sum of the plurality of attenuation components, i.e. based on S $A_i(f)$.

In other words, if the reference signal, occupies more than one spectral band 401, 402, 602, and the energy of the reference signal within more than one band 402, 602 exceeds the predetermined distortion threshold values 411, 412, the exponential attenuation curves 541, 542, 661, 662 may be superimposed onto each other, in order to yield an overall attenuation curve for determining the attenuation factors per spectral band 401, 402, 602.

It should be noted that the decay properties (e.g. the decay time constants) of the attenuation decay curves 541, 542, 661, 662 may be, adapted. In particular, the decay curves may be adapted to the distortion characteristics of the electronic device 100. By way of example, in a similar manner to (and/or based on) the THD and/or echo canceller performance curves 206, a decay curve 541, 542, 661, 662 may be determined for some or all of the spectral bands 401, 402, 602. In particular, the energy of the distortion components 411 in the neighbouring spectral bands 401 may be measured for distorting components 422 in different spectral bands 402 n=1, . . . , N. The energy of the distortion components 411 provides an indication of the required attenuation in the neighbouring spectral bands 401. By way of example, the attenuation may be selected to be proportional to the energy of the distortion components 411. Alternatively, the distribution of the energy of the distortion components 411 may be approximated by an exponential decay curve which is used to determine the attenuation factors of the post-filter 301. As such, the attenuation factors of the post-filter 301 may be adapted to the distortion characteristics of the electronic device 100.

In a similar manner, the distortion thresholds T(n) may be programmable. In particular, the distortion thresholds T(n) may be adapted to the distortion characteristics of the electronic device 100. By way of example, the distortion thresholds T(n) may be determined based on the THD and/or echo canceller performance curves 206.

Furthermore, the attenuation target $A_{max}$ of the post-filter 301 may be programmable per distorting spectral band. The attenuation target $A_{max}$ may indicate the maximum attenuation that the post-filter 301 inserts per distorting spectral band. The attenuation target $A_{max}$ may be selected to compensate for deviations of the power of the harmonic distortions from the assumption of an exponential spectral decay.

As such, the configuration of decay constants of the attenuation curves, the attenuation targets and/or the distortion thresholds may be set through a one-time characterisation of the non-linear (acoustic) behaviour of the cabinet and the speaker of the electronic device 100. In other words, the attenuation curves A(f), the attenuation targets $A_{max}$ and/or the distortion thresholds T(f) may be dependent on the distortion characteristics of the electronic device 100. In yet other words, the frequency dependent attenuation behaviour of the post-filter 301 may be designed in accordance to the frequency dependent distortion behaviour of the electronic device 100. This design may be performed upon initialization of the electronic device 100 or during the design stage, the development stage or the manufacturing stage.

Furthermore, it should be noted that the distortion thresholds T(n) may be adapted to various conditions of the electronic device 100 which may impact the distortion characteristics of the electronic device 100. In particular, the distortion thresholds T(n) may be adapted to the battery level of a portable electronic device 100, for which the speaker amplitude is typically directly related to the device's battery voltage level. In a similar manner, the distortions thresholds T(n) may be a function of the volume settings of the volume control unit 202 which directly impact the energy of the reference signal emitted by the speaker 204 of the device 100 (and consequently the extent of distortions).

The presently described post-filter schemes may be enhanced by performing frequency smoothing to avoid musical noise if sub-band transitions are too steep. In other words, step-like transitions of the energy between adjacent spectral bands may cause ringing artefacts in the time domain signal. Hence, the perceptual performance of the post-filter schemes may be enhanced by smoothing the attenuated sub-bands at the transition between adjacent spectral bands. Such smoothening may take place in the transition from the perceptually based sub-band domain to the uniform FFT bin domain.

The distortion detection efficiency may be further improved by combining the threshold detection based on T(n) with positive signal derivative detection. Positive signal derivative detection is based on the derivative of the spectral energy E(n) along the time line. An onset of distortion may be detected earlier when detected a temporal increase of the spectral energy E(n) which exceeds a certain onset threshold, rather than waiting for the spectral energy E(n) to exceed the distortion threshold T(n).

In the present document, the use of a frequency dependent post-filter is described to improve the stability of echo cancellation and suppression in hands-free applications. The post-filter applies a frequency dependent attenuation of neighbouring spectral bands of a distorting spectral band; in cases the signal energy in the distorting spectral band exceeds a predetermined energy level. As a result of the frequency dependent attenuation applied by the post-filter, the overall hands-free application (comprising an echo canceller, the post filter and possibly a half-duplex switch) requires a reduced amount of half-duplex switching compared to a hands-free application without the use of the post-filter. This results in an improved duplexity performance of the overall hands-free application.

Figure 7:
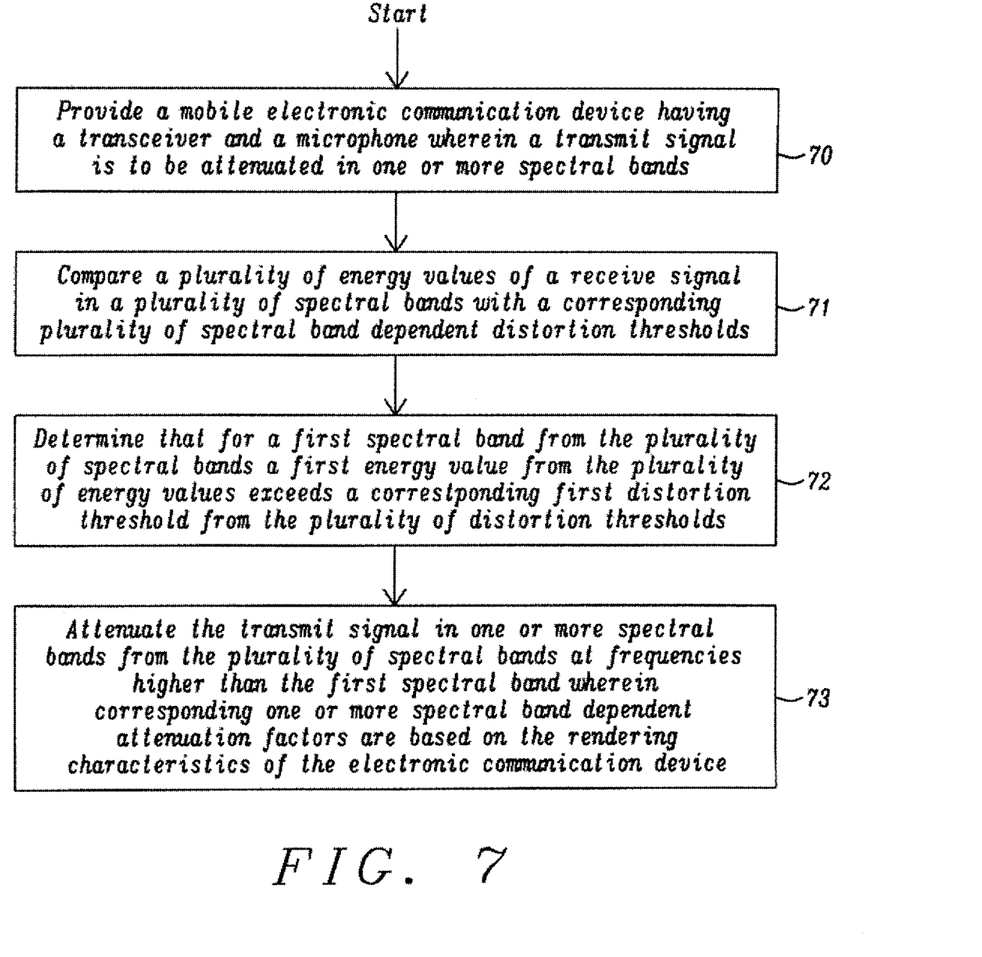
FIG. 7 illustrates a flowchart of a method for attenuating a transmit signal in one or more spectral bands based on a receive signal.

FIG. 7 illustrates a flowchart of a method for attenuating a transmit signal in one or more spectral bands based on a receive signal, wherein the transmit signal comprises an echo of the receive signal, wherein the echo comprised within the transmit signal comprises distortions incurred by the receive signal when being rendered by an electronic device having rendering characteristics.

Step 70 of the method of FIG. 7 illustrates the provision of a mobile electronic communication device having a transceiver and a microphone, wherein a transmit signal is to be attenuated in one or more spectral bands. Such a device could be e.g. a mobile telephone, a smartphone or a cordless phone. Step 71 depicts comparing a plurality of energy values of a receive signal in a plurality of spectral bands with a corresponding plurality of spectral band dependent distortion thresholds. Step 72 shows determining that for a first spectral band from the plurality of spectral bands, a first energy value from the plurality of energy values exceeds a corresponding first distortion threshold from the plurality of distortion thresholds and step 73 illustrates attenuating the transmit signal in one or more spectral bands from the plurality of spectral bands at frequencies higher than the first spectral band with corresponding one or more spectral band dependent attenuation factors, wherein the one or more spectral band dependent attenuation factors are based on the rendering characteristics of the electronic communication device.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. An attenuation circuit configured to attenuate a transmit signal in one or more spectral bands based on a receive signal; wherein the transmit signal comprises an echo of the receive signal; wherein the echo comprised within the transmit signal comprises distortions incurred by the receive signal when being rendered by an electronic device having rendering characteristics; wherein the circuit is configured to compare a plurality of energy values of the receive signal in a plurality of spectral bands with a corresponding plurality of spectral band dependent distortion thresholds;

determine that for a first spectral band from the plurality of spectral bands, a first energy value from the plurality of energy values exceeds a corresponding first distortion threshold from the plurality of distortion thresholds; and attenuate the transmit signal in one or more spectral bands from the plurality of spectral bands at frequencies higher than the first spectral band with corresponding one or more spectral band dependent attenuation factors; wherein the one or more spectral band dependent attenuation factors are based on the rendering characteristics of the electronic device.

2. The circuit of claim 1, wherein the rendering characteristics are represented by one or more of: a frequency dependent total harmonic distortion of the electronic device, an echo canceller performance of an echo canceller comprised within the electronic device, a battery level of a battery comprised within the electronic device and a volume setting of a volume controller comprised within the electronic device.

3. The circuit of claim 1, wherein the one or more spectral band dependent attenuation factors each comprise a first attenuation component dependent on the first spectral band.

4. The circuit of claim 3, wherein the first attenuation component of the one or more spectral band dependent attenuation factors approximates a spectral shape of the rendering characteristics of the electronic device when rendering a spectral component in the first spectral band of the receive signal.

5. The circuit of claim 3, wherein the first attenuation component of the one or more spectral band dependent attenuation factors decreases with increasing spectral distance from the first spectral band.

6. The circuit of claim 5, wherein
the first attenuation component decreases according to an exponential function having a nominal attenuation and a first decay constant; and
the nominal attenuation and the first decay constant are determined based on the rendering characteristics of the electronic device.

7. The circuit of claim 1, wherein
the circuit is configured to attenuate the transmit signal in the first spectral band with a corresponding first attenuation factor;
the first attenuation factor comprises a first attenuation component dependent on the first spectral band; and
the first attenuation component of the first attenuation factor is one.

8. The circuit of claim 3, wherein
the circuit is configured to determine that for a second spectral band from the plurality of spectral bands, a second energy value from the plurality of energy values exceeds a corresponding second distortion threshold from the plurality of distortion thresholds;
the one or more spectral band dependent attenuation factors comprise a second attenuation component dependent on the second spectral band;
the second attenuation component decreases with increasing spectral distance from the second spectral band; and
the one or more spectral band dependent attenuation factors are based on a combination of the first and the second attenuation components.

9. The circuit of claim 1, wherein the plurality of spectral band dependent distortion thresholds are based on the rendering characteristics of the electronic device.

10. The circuit of claim 3, wherein the circuit is configured to attenuate the transmit signal in one or more spectral bands from the plurality of spectral bands at frequencies lower than the first spectral band with corresponding one or more lower spectral band dependent attenuation factors; wherein the one or more lower spectral band dependent attenuation factors are based on the rendering characteristics of the electronic device.

11. The circuit of claim 10, wherein
the one or more lower spectral band dependent attenuation factors comprise a first attenuation component dependent on the first spectral band; and
the first attenuation component of the one or more lower spectral band dependent attenuation factors is symmetrical to the first attenuation component of the one or more spectral band dependent attenuation factors with regards to the first spectral band.

12. The circuit of claim 1, wherein the plurality of spectral bands have critical band spacing.

13. A method for attenuating a transmit signal in one or more spectral bands based on a receive signal, wherein the transmit signal comprises an echo of the receive signal, wherein the echo comprised within the transmit signal comprises distortions incurred by the receive signal when being rendered by an electronic communication device having rendering characteristics; the method comprising:
providing a mobile electronic communication device having a transceiver and a microphone, wherein a transmit signal is to be attenuated in one or more spectral bands;
comparing a plurality of energy values of a receive signal in a plurality of spectral bands with a corresponding plurality of spectral band dependent distortion thresholds;
determining that for a first spectral band from the plurality of spectral bands, a first energy value from the plurality of energy values exceeds a corresponding first distortion threshold from the plurality of distortion thresholds; and
attenuating the transmit signal in one or more spectral bands from the plurality of spectral bands at frequencies higher than the first spectral band with corresponding one or more spectral band dependent attenuation factors, wherein the one or more spectral band dependent attenuation factors are based on the rendering characteristics of the electronic communication device.

14. The method of claim 13 further comprising
estimating an echo in the first spectral band from the receive signal;
receiving a captured signal, wherein the captured signal comprises the echo of the receive signal; and
removing the estimated echo in the first spectral band from the captured signal, thereby yielding the transmit signal.

15. The method of claim 13, wherein the electronic communication device is a mobile phone.

16. The method of claim 13, wherein the electronic communication device is a cordless phone.

17. The method of claim 13, wherein the rendering characteristics of the electronic device are described by a frequency dependent total harmonic distortion of the electronic device.

18. The method of claim 13, wherein the rendering characteristics of the electronic device are described by an echo canceller performance of an echo canceller comprised within the electronic device.

19. The method of claim 13, wherein the rendering characteristics of the electronic device are time-dependent.

20. The method of claim 19, wherein the rendering characteristics of the electronic device are periodically determined with a pre-determined frequency.

21. The method of claim 19, wherein a performance of an echo canceller is periodically determined with a pre-determined frequency.

22. The method of claim 13, wherein said comparing the plurality of energy values comprises transforming the receive signal into the frequency domain, wherein the frequency domain may be split up into a plurality of spectral bands.

23. The method of claim 22, wherein the width of the different spectral bands within the plurality of spectral bands is adapted to perception characteristics of the human ear.

24. The method of claim 22, wherein the width of the different spectral bands within the plurality of spectral bands is adapted by uniform band spacing.

25. The method of claim 13, wherein the energy values of each of the plurality of spectral bands are determined for a particular frame comprising a pre-determined number of samples.

26. The method of claim 13, wherein the energy values of each of the plurality of spectral bands are determined as moving averages over a pre-determined time interval of the receive signal.

27. The method of claim 13, wherein the distortion thresholds are determined offline based on the rendering characteristics of the electronic device.

28. The method of claim 13, wherein the distortion thresholds are determined in real-time based on the rendering characteristics of the electronic device.

29. The method of claim 28, wherein the distortion thresholds are determined in a periodic manner.

30. The method of claim 28, wherein the distortion thresholds are inversely proportional to the total harmonic distortion value of the electronic device in a spectral band.

31. A circuit for measuring total harmonic distortion characteristic of a transducer of an electronic mobile communication device comprising:
a receive signal path comprising:
an automatic gain controller;
a volume controller at the output of the automatic gain controller;
a first equalization filter at the output of the volume controller;
a transducer at the output of equalization filter;
means for generating a sweep of sinusoids at different frequencies providing input to the volume controller; and
an external microphone recording an acoustic signal emitted by the speaker, which is excited by the sinusoids at a particular frequency f, wherein the emitted acoustic signal may comprise signal power at higher harmonic frequencies of the particular frequency f and wherein a signal power at higher harmonic frequencies is due to non-linear distortions of the signal at the fundamental frequency f.

32. The circuit of claim 31, wherein the total harmonic distortion characteristic is determined from an energy of an emitted audio signal of the transducer at a particular frequency f, and from an energy of an emitted audio signal of the transducer at higher harmonic frequencies.

33. The circuit of claim 31, wherein the transducer is a speaker.

34. The circuit of claim 31 further used for measuring a performance of an echo canceller, further comprising:
an internal microphone recording said sweep of sinusoids;
a second equalization filter processing an audio signal from the internal microphone recording said sweep of sinusoids wherein signals from an output of the second equalization filter are an input to an echo cancellation filter;

said echo cancellation filter using an echo cancellation adder to yield an echo cancelled signal, wherein the echo cancellation filter corrects the signals from the second equalization filter by a predicted audio signal from the output of the volume controller, wherein a linear prediction filter determines the predicted audio signal as a weighted linear combination of one or more delayed versions of the audio signal on the receive signal path.

35. The circuit of claim 34, wherein the performance of the echo cancellation filter is determined as a ratio of the power of the echo cancelled signal and the power of the recorded signal prior to the echo cancellation adder.

36. An echo suppression circuit for an electronic device comprising:

a speaker and a microphone, wherein a receive signal is rendered by the speaker and a captured signal is captured by the microphone, wherein the captured signal comprises an echo of the receive signal, wherein the echo comprises a primary echo component in a first spectral band and one or more distortion echo components in one or more spectral bands at frequencies higher than the first spectral band, wherein the echo suppression circuit comprising:

an echo cancelling circuit configured to estimate the primary echo component from the receive signal and to remove the estimated primary echo component from the captured signal, thereby yielding a transmit signal; and a frequency dependent post filter configured to attenuate the transmit signal in the one or more spectral bands; wherein the transmit signal comprises an echo of the receive signal; wherein the echo comprised within the transmit signal comprises distortions incurred by the receive signal when being rendered by an electronic device having rendering characteristics; wherein the circuit is configured to compare a plurality of energy values of the receive signal in a plurality of spectral bands with a corresponding plurality of spectral band dependent distortion thresholds;

determine that for a first spectral band from the plurality of spectral bands, a first energy value from the plurality of energy values exceeds a corresponding first distortion threshold from the plurality of distortion thresholds; and attenuate the transmit signal in one or more spectral bands from the plurality of spectral bands at frequencies higher than the first spectral band with corresponding one or more spectral band dependent attenuation factors; wherein the one or more spectral band dependent attenuation factors are based on the rendering characteristics of the electronic device.

37. The circuit of claim 36, wherein the rendering characteristics are represented by one or more of: a frequency dependent total harmonic distortion of the electronic device, an echo canceller performance of an echo canceller comprised within the electronic device, a battery level of a battery comprised within the electronic device and a volume setting of a volume controller comprised within the electronic device.

38. The circuit of claim 36, wherein the one or more spectral band dependent attenuation factors each comprise a first attenuation component dependent on the first spectral band.

39. The circuit of claim 38, wherein the first attenuation component of the one or more spectral band dependent attenuation factors approximates a spectral shape of the rendering characteristics of the electronic device when rendering a spectral component in the first spectral band of the receive signal.

40. The circuit of claim 39, wherein the first attenuation component of the one or more spectral band dependent attenuation factors decreases with increasing spectral distance from the first spectral band.

41. The circuit of claim 38, wherein
the first attenuation component decreases according to an exponential function having a nominal attenuation and a first decay constant; and
the nominal attenuation and the first decay constant are determined based on the rendering characteristics of the electronic device.

42. The circuit of claim 36, wherein
the circuit is configured to attenuate the transmit signal in the first spectral band with a corresponding first attenuation factor;
the first attenuation factor comprises a first attenuation component dependent on the first spectral band; and
the first attenuation component of the first attenuation factor is one.

43. The circuit of claim 38, wherein
the circuit is configured to determine that for a second spectral band from the plurality of spectral bands, a second energy value from the plurality of energy values exceeds a corresponding second distortion threshold from the plurality of distortion thresholds;
the one or more spectral band dependent attenuation factors comprise a second attenuation component dependent on the second spectral band;
the second attenuation component decreases with increasing spectral distance from the second spectral band; and
the one or more spectral band dependent attenuation factors are based on a combination of the first and the second attenuation components.

44. The circuit of claim 36, wherein the plurality of spectral band dependent distortion thresholds are based on the rendering characteristics of the electronic device.

45. The circuit of claim 38, wherein the circuit is configured to attenuate the transmit signal in one or more spectral bands from the plurality of spectral bands at frequencies lower than the first spectral band with corresponding one or more lower spectral band dependent attenuation factors; wherein the one or more lower spectral band dependent attenuation factors are based on the rendering characteristics of the electronic device.

46. The circuit of claim 45, wherein
the one or more lower spectral band dependent attenuation factors comprise a first attenuation component dependent on the first spectral band; and
the first attenuation component of the one or more lower spectral band dependent attenuation factors is symmetrical to the first attenuation component of the one or more spectral band dependent attenuation factors with regards to the first spectral band.

47. The circuit of claim 36, wherein the plurality of spectral bands have critical band spacing.

* * * * *